Dec. 5, 1939.   P. M. CARTER ET AL   2,181,963
FLUID PRESSURE OPERATED GEAR SHIFTER
Filed April 5, 1938   4 Sheets-Sheet 1

INVENTORS
Philip M. Carter and Louis A. Larsen
BY
Morgan Finnegan and Durham
ATTORNEYS

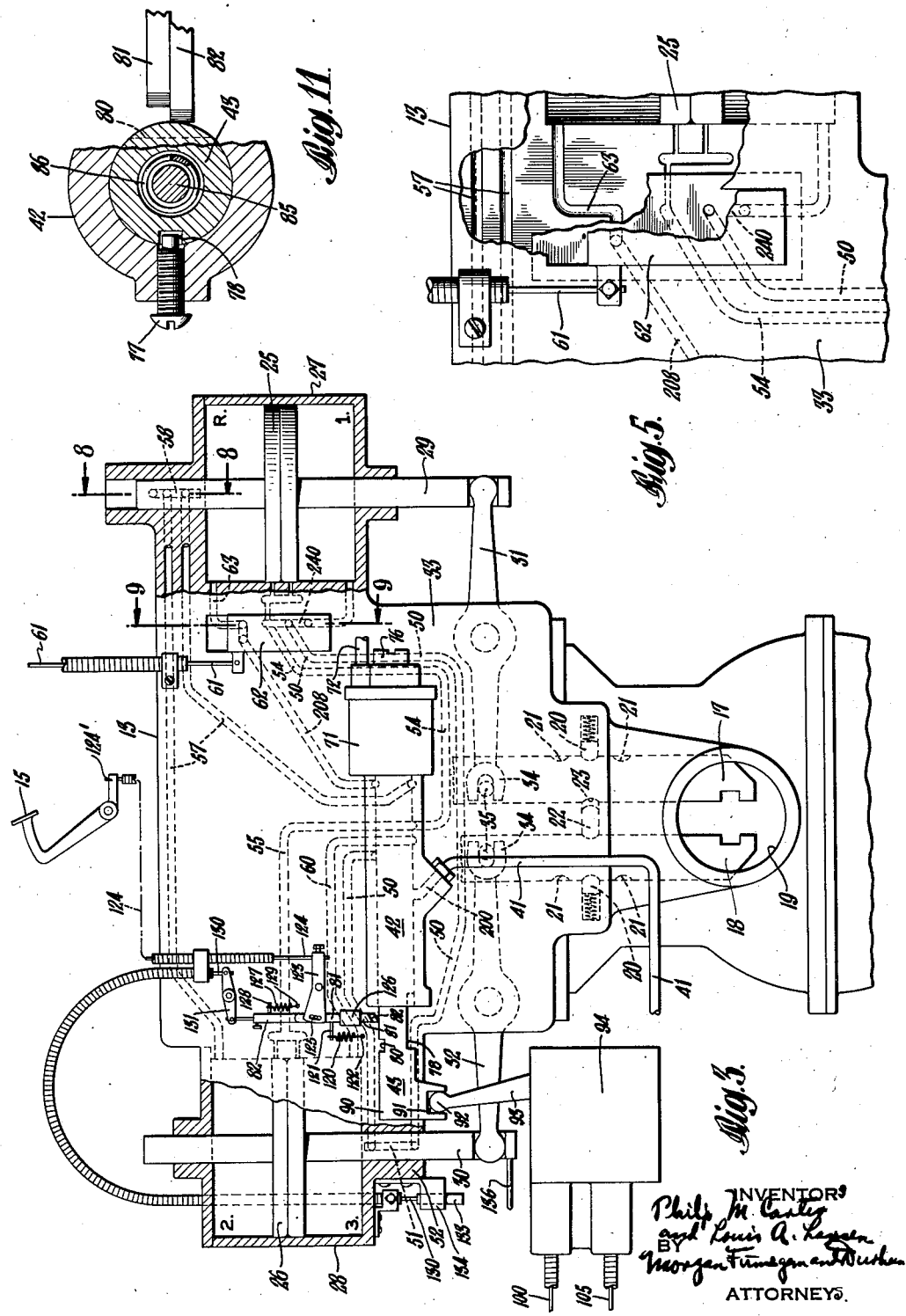

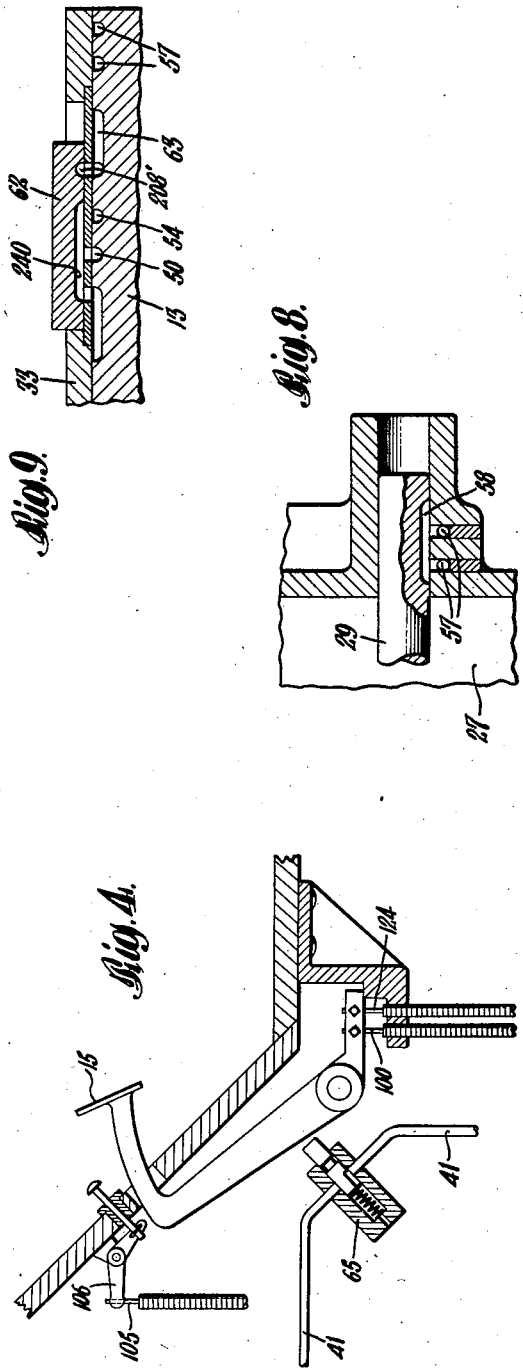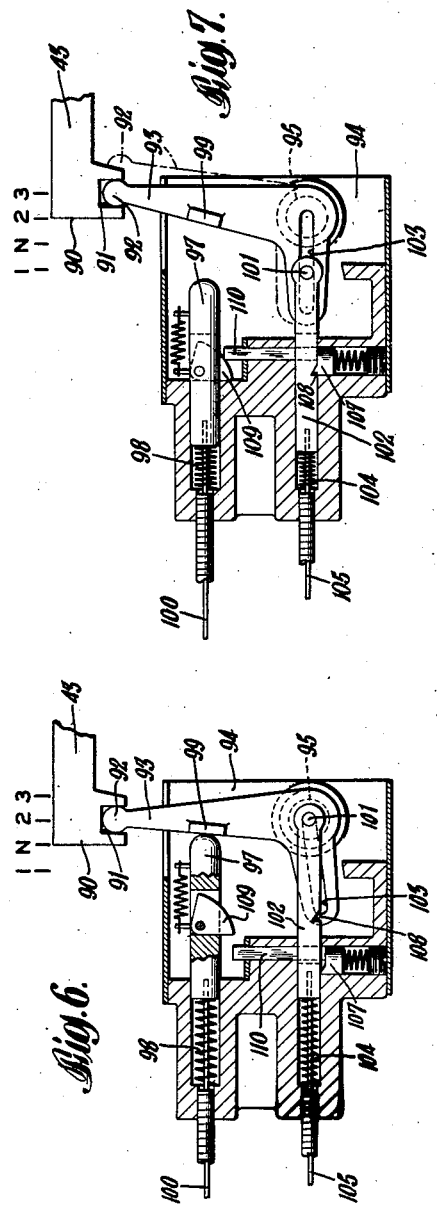

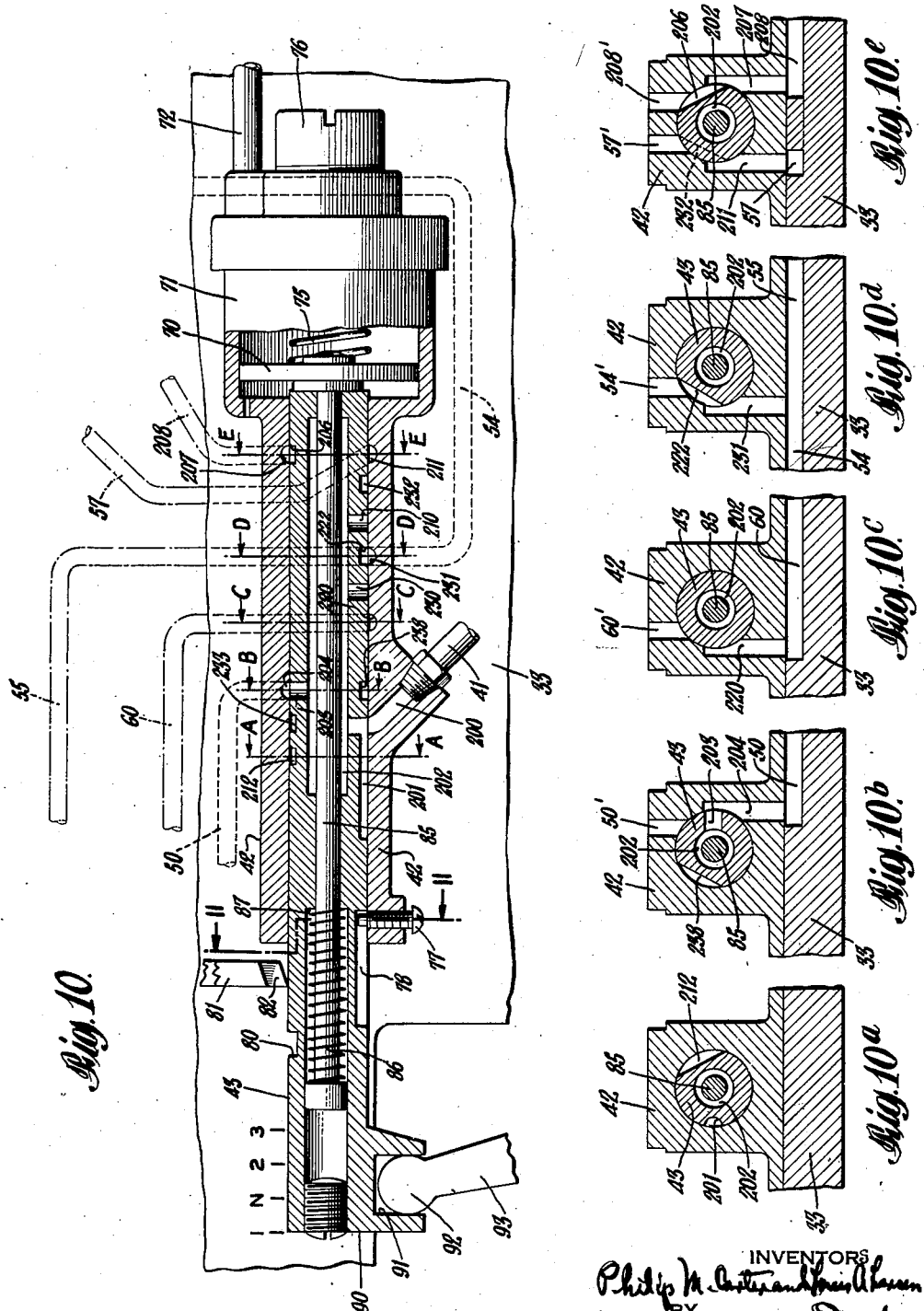

Patented Dec. 5, 1939

2,181,963

UNITED STATES PATENT OFFICE 2,181,963

FLUID PRESSURE OPERATED GEAR SHIFTER

Philip M. Carter, New York, N. Y., and Louis A. Larsen, Canton, Ohio, assignors to Vaco Products, Inc., Jersey City, N. J., a corporation of Delaware Application April 5, 1938, Serial No. 200,086

19 Claims. (Cl. 192—3.5)

The present invention relates to automotive vehicles and more particularly to a novel and improved fluid pressure operated transmission gear shifting device for use with such vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The present invention has for its object the provision of a novel and improved fluid pressure operated gear shifting device particularly adapted for shifting the transmission gears in an automotive vehicle from one speed ratio to another substantially automatically once the vehicle is set in motion and yet under substantially complete control of the operator. Another object is the provision of an improved power-operated gear shifting device for automotive vehicles in which the shift from one gear ratio to another takes place upon the operator performing or controlling certain other necessary operations and after the vehicle has been set in motion, the gear shifting operations being carried out in accordance with a predetermined schedule which is, however, subject to control of the operator as may be desired in view of the momentary driving conditions. Still another object of the invention is the provision of an improved fluid pressure operated gear shifting device for automotive vehicles in which the gear shifting operations are carried out upon declutching under control of a device which is controlled by motion of the vehicle but is not responsive to the varying speed thereof. A further object is the provision of a simple and inexpensive vacuum operated gear shifting mechanism which is reliable in operation and in which the selector valve is urged with a force which is independent of vehicle speed from its position of rest by forward movement of the vehicle.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 2 is a fragmentary cross section through a portion of the control mechanism employed in the present embodiment;

Figure 3 is a plan view, with certain parts broken away, of the present embodiment of a gear shifting mechanism and control therefor;

Figure 4 is a diagrammatic vertical section of a clutch pedal and the associated control devices;

Figure 5 is a detailed plan view, with certain parts broken away, of the reversing valve shown in Figure 3;

Figures 6 and 7 are detailed sectional views of the means for manually moving the selector valve and showing different positions of these means.

Figure 8 is a fragmentary vertical section taken on the line 8—8 of Figure 3;

Figure 9 is a fragmentary detailed section taken on the line 9—9 of Figure 3;

Figure 10 is a detailed horizontal section of the selector valve;

Figure 1:
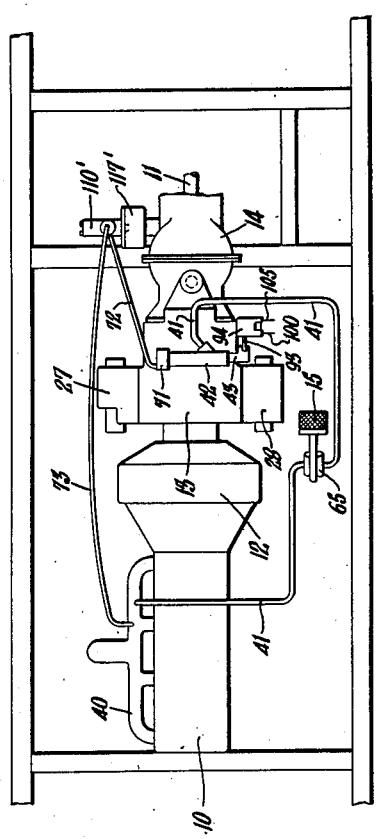
Figure 1 is a diagrammatic plan view showing the general arrangement of the present embodiment.

Figures 10a, 10b, 10c, 10d, and 10e are fragmentary detailed sectional views taken on the section lines A—A, B—B, C—C, D—D and E—E, respectively of Figure 10; and Figure 11 is a fragmentary section taken on the line 11—11 of Figure 10.

This application is a continuation in part of our prior application Ser. No. 37,266, filed August 22, 1935.

In accordance with the illustrative embodiment of the invention, the automotive vehicle is provided with an internal combustion engine, a clutch, and selectively shiftable transmission gears through which power is transmitted from the engine to the traction wheels of the vehicle, all of the foregoing parts being of substantially conventional construction. Vacuum operated pistons are provided and suitably connected to the shiftable transmission gears to shift the gears from one speed ratio to another so that the vehicle may be operated in any of its forward speeds or in reverse, the vacuum being applied from the intake manifold of the engine to the pistons under control of a selector valve. Means are provided for constantly urging the selector valve towards first speed position, and other means are provided for constantly urging the valve away from its first speed position and against the first means whenever the vehicle is in motion in a forward direction. Means associated with the clutch or clutch operating members are provided for controlling the application of vacuum to the pistons so that gear shifting can occur only when the clutch is disengaged, and also for moving the selector valve away from its neutral position to first speed position, as well as for permitting the valve to move from an intermediate speed position to high speed position after the vehicle has been set in motion and the gears have been shifted to the intermediate speed position. Thus, in the operation of the device, the clutch is disengaged while the vehicle is at rest, moving the selector valve to first speed position and causing the gears to be shifted to first speed position. As the car is set in motion by engagement of the clutch, the valve is moved to intermediate speed position and when the clutch is next disengaged, the gears are shifted to intermediate speed position and the valve is released permitting it to move to high speed position, and the gears are correspondingly shifted when the clutch is again disengaged. Manual control means are provided for applying vacuum when the vehicle is substantially at rest to the piston corresponding to reverse speed, and other means are provided for moving the selector valve to second speed position from any of its other positions and regardless of whether the vehicle is moving or not.

Vacuum operated means may be provided for moving the selector valve from its normal or neutral position which it has while the vehicle is at rest, and these vacuum operated means may be controlled by various means which cause the application of vacuum to move the selector valve as soon as the vehicle has attained a slight forward speed. As an example of one suitable means for controlling the movement of the selector valve, a valve may be provided which is normally closed but is moved to open position by means sensitive to motion of the vehicle and not responsive to variable vehicle speeds, this valve being returned to its normal position when the vehicle is slowed to a very slow speed or is brought to rest.

Although the invention is applicable to transmission gearing having more than one reverse and three forward speeds the present embodiment is particularly adapted for use with the conventional type of transmission and is so shown and described. Similarly, in certain respects the invention is not limited to a gear shifting device operated by vacuum, but other forms of power may be used.

It will be understood that the foregoing general description and the following detailed description as well, are exemplary and explanatory of the invention but are not restrictive thereof.

Referring now in detail to the illustrative embodiment of the invention as shown in the accompanying drawings, the present invention is shown as adapted for shifting the gears of a conventional type of three speed and reverse transmission in an automotive vehicle propelled by an internal combustion engine. As is usual, the internal combustion engine 10 is adapted to drive a propeller shaft 11 through a clutch 12, a selective shiftable gear transmission 13 and a universal joint 14. A clutch pedal 15 is provided for operating the clutch although the clutch may, if desired, be operated by means of a power cylinder adapted to cause disengagement of the clutch when the throttle is substantially closed.

The transmission unit 13 comprises the usual shiftable transmission gears which are moved into their respective speed positions by means of the gear shifting rods 17 and 18, slidably mounted in the transmission casing, and may be moved in case of emergency by means of a lever to be positioned in the lever socket 19 at the rear of the transmission. As shown, the transmission is designed to produce three forward speeds and one reverse speed, and the rod 17 is moved forward to place the gears in first speed position, or rearwardly for reverse, while rod 18 is moved reversely to place the gears in second speed or forwardly to place the gears in third speed position. Detent means are provided for centering the rods in their respective positions and for this position there are provided spring pressed plungers 20 cooperating with notches 21 in the sides of the rods 17 and 18. Interlock means are provided preventing movement of either of the rods 17 or 18 while the other rod is not in neutral or central position, and these means comprise a plunger 22 slidably mounted in the top of the casing positioned between the rods 17 and 18 and adapted to engage in one or the other of notches 23 while the other rod is moved away from its neutral position.

Power means are provided for moving the rods 17 and 18 to their several positions to shift the transmission gears and for this purpose vacuum operated pistons 25 and 26 are provided slidably mounted in their respective double ended cylinders 27 and 28, one at either side of the transmission casing, and having their piston rods projecting through the ends of the cylinders and tightly, yet slidably, mounted therein.

At their rear ends the piston rods 29 and 30 are connected to their respective rods 17 and 18 by means of levers 31 and 32 pivotally mounted on the upper surface of the plate 33 forming the cover for the transmission casing. Levers 31 and 32 are connected to the rods 17 and 18 by means of their forked ends 34 and the pins 35 projecting upwardly to and anchored in the rods 17 and 18.

Means are provided for applying vacuum selectively and individually to the cylinders 27 and 28 as required to shift the gears from one position to another and this vacuum is advantageously derived from the intake manifold 40 of the engine 10, and is applied to the gear shifting mechanism through a main supply line 41 which is connected to the casing 42 surrounding the slidable selector valve body 43. As will be more fully described, this valve determines which of the cylinder ends is subjected to vacuum to move one or the other of the pistons 25 or 26 in one direction or the other. The selector valve has four positions: First speed or reverse, neutral, second speed and third speed, and may be moved from one or the other of its positions to any other position to control the application of vacuum accordingly.

In its first speed position, the selector valve applies vacuum through line 50 to the rear face of piston 25, and this line is open from the selector valve to the cylinder 27 only when the piston 26 is in its neutral position, passing through the slide valve formed by the groove 51 in piston rod 30 where it passes through the boss 52 at the end of cylinder 28. Groove 51 is similar in construction to groove 58 shown in detail in Fig. 8. Line 50 also passes through a reversing valve which will be described in connection with the reversing operation.

In its neutral position, the selector valve causes the application of vacuum from the manifold 40 to the lines 54 and 55 connected to the central portions of cylinders 27 and 28 respectively, and thereby tending to move both pistons to neutral position.

In second speed position, the selector valve causes the application of vacuum to the line 57 and thereby to the forward side of piston 26 provided the piston 25 is in its central or neutral position so as to open the slide valve 58 formed on the end of piston rod 29.

In high or third speed position, vacuum is applied through line 60 to the rear side of the piston 26 to move it rearwardly.

The selector valve 43 is also provided with suitable venting apertures, so that the cylinders are vented as the corresponding pistons are moved. Thus when the piston 26 is moving from second speed position to third speed position by the application of suction to the rear face of piston 26, the forward portion of the cylinder 28 is vented to atmosphere so that no resistance is offered to the movement of the piston.

For moving piston 25 to reverse position, a separate reversing valve is provided which may be manually moved from forward to reverse position by means of the push wire control 61. This reversing valve comprises a slide valve body 62 which can be moved forwardly and when so moved connects the first speed line 50 with a line 63 communicating with the forward portion of cylinder 27 to apply vacuum to the forward side of the piston 25.

The various lines 50, 54, 55, 57 and 60 may conveniently be formed as ducts in the cover plate 33 and are so shown in the drawings. Venting ports 50', 60', 54', 57' and 208' correspond respectively to the first speed duct 50, third speed duct 60, neutral duct 54, second speed duct 57, and reverse duct 208.

Means are provided for controlling the application of vacuum to the gear shifter by the position of the clutch, and for this purpose a master valve 65 is provided in the line 41 between the intake manifold 10 and the gear shifter, this valve being positioned adjacent to the clutch pedal 15 and adapted to be opened only by movement of the clutch pedal to clutch disengaging position, thereby preventing shifting of the gears while power is being transmitted through the transmission.

In the present embodiment of the invention vacuum means are provided for urging the valve 43 away from its normal position, as shown in Figure 3 and which corresponds to "neutral," towards second and third speed positions, and other means are provided for controlling this movement in accordance with a predetermined schedule so that the movement is controlled by other necessary operations, as for instance by disengagements of the clutch.

For this purpose, and as shown in Figure 10, the selector valve body 43 is connected at its right end to a piston 70 operating within a small cylinder 71 at the right hand end of the valve casing 42 and connected thereto. Vacuum may be applied, to move the valve body 43 and piston 70 to the right, through a pipe 72 connected to the intake manifold 40 and under control of a master control unit so that vacuum is applied when the vehicle is set in motion.

Spring means are provided for urging the valve body to the left, towards neutral or first speed position, and for this purpose a spring 75 is compressed between the end of piston 70 and an adjusting screw 76 threaded into the end of the cylinder 71. Movement of the valve body 43 is limited by means of a set screw 77 threaded into the valve casing 42 and operating in a groove 78 formed in the valve body 43, also serving to hold the valve body against rotation.

Means are also provided for retaining the valve in second speed position while accelerating until the clutch is reengaged after the gears have been meshed in second speed position, thereby preventing unintentional skipping of second speed, and for this purpose valve body 43 is formed with a notch 80 adapted to cooperate with releasable latches 81 and 82 mounted adjacent thereto.

Latches 81 and 82 are normally spring urged towards the valve body and into notch 80 when the valve is in second speed position. Latch 81 may be withdrawn by engagement of the clutch, while latch 82 may be withdrawn by the shifting of the gears into second speed position, and when the clutch is reengaged with the gears in second speed position, both latches are withdrawn and the selector valve may then move to third speed position. Latch 81 is spring pressed towards notch 80 by means of spring 120 tensioned between pin 121 on the latch 81 and pin 122 on the shifter cover plate 33 and this latch is held away from valve 43 by means of the lever 123 which is connected to push wire 124 at one end and at its other end is connected to the latch by means of pin and slot connection 125. Push wire 124 is also connected at 124' to the clutch pedal 15 so as to retract the latch 81 when the clutch pedal is released for clutch engagement.

Latch 82 is withdrawn from latching engagement with notch 80 by movement of the piston 26 into second speed position. As embodied, latches 81 and 82 are both slidably secured in superposed relation to the cover plate 33 by means of the guide bracket 126, and latch 82 is urged towards the valve body 43 and into notch 80 by means of the tension spring 127 stretched between pin 128 on latch 82 and pin 129 on cover plate 33. Latch 82 is retracted by means of the push wire 130, one end of which is connected to pivoted lever 131 also connected to latch 82, while the other end is connected to a slidable plunger 133 slidable in bracket 134 attached to the cylinder 28 and positioned so as to be engaged by pin 136 on piston rod 30 as the piston moves into second speed position.

The valve engaging ends of both latches 81 and 82 are bevelled so that movement of the valve to a lower speed position (to the left in Figure 3) is not interfered with.

In the illustrative embodiment and for moving the valve away from its normal or neutral position, and for moving the valve body 43 to second speed position from any of its other positions, as desired, the valve body has fitted within it a rod 85 which is fixed to piston 70 at one end, and at its other end is headed to compress a spring 86 between the head and a shoulder 87 within the hollow part of the body 43, thereby permitting the valve body to move in one direction independently of the rod 85 and against the compression of spring 86.

Valve body 43 is formed with an enlarged head 90 having a socket 91 into which is fitted the rounded end 92 of a bell crank 93. Bell crank 93 is pivotally mounted in its mounting frame 94 by means of a pivot 95 and is normally held in the neutral position shown in Figure 6, so that the vehicle is brought to rest with the gears in neutral position. When it is desired to move the valve to first speed position (extreme left) the clutch pedal 15 is depressed causing plunger 97 to be retracted against the compression of spring 98 and thereby removing the interference of plunger 97 with the ledge 99 on bell crank 93. During the normal shifting operation, as just described for first speed, the clutch pedal 15 is depressed sufficiently to disengage the clutch but not sufficiently to come in contact with the member for operating bell crank 106. Plunger 97 may be connected with the clutch pedal 15 for operation by means of pull wire 100.

A second plunger 102 is also mounted in the frame 94 and is adapted to be moved under control of the clutch pedal 15. Plunger 102 is provided with a pin 101 at its end projecting into a slot 103 in one arm of bell crank 93 which arm is normally set at a slight angle to the plunger 102. As plunger 102 is withdrawn against the compression of its spring 104, bell crank 93 is moved from the neutral position shown in Figure 6, or from high speed position, to the position shown in Figure 7, by extreme depression of the clutch pedal 15 thereby operating bell crank 106 and wire 105 to move pin 101 outwardly in slot 103 and thereby move the valve to second speed position. Plunger 102 is connected to pull wire 105 which is connected to bell crank 106 pivoted immediately below the clutch pedal and adapted to be moved only by extreme depression of the clutch pedal 15. A latch 107 cooperates with a notch 108 in plunger 102 to retain the plunger 102 in second speed position until the latch has been released by return of the clutch pedal. As the clutch pedal by the conventional clutch engaging spring (not shown) returns, pivoted finger 109 on plunger 97 coacts with an extension 110 of latch 107 to release the latch and allow plunger 102 to return to the position where its pin 101 is concentric with respect to pivot 95. Finger 109 is held in the position shown by a tension spring, but can move pivotally to pass over the upper projecting end of extension 110. Where the movement of the valve body 43 is from third to second speed position, the valve may move against the compression of spring 86, rather than against the more powerful suction exerted on piston 70.

Means are provided for moving the valve to second speed and then to third speed positions when the vehicle has been set in motion, and for this purpose means are provided for controlling the application of vacuum to the piston 70. As embodied, there is provided a valve normally venting the line 72 when the vehicle is at rest, but causing suction to be applied thereto as soon as the vehicle has been set in motion or has attained a speed of from one to four miles per hour. This valve comprises a valve body 110' in which is slidably mounted a valve plunger 111 normally moved to venting position by means of a spring 112. Valve plunger 111 is provided with a vent 113 and a groove 114, groove 114 serving to connect lines 72 to line 73 which is, in turn, connected to the manifold 40. At one end of plunger 111 is provided a pair of small pivotally mounted weights 115, eccentrically mounted on shaft 117 and formed with cam toes 116 to engage and move plunger 111. As soon as the vehicle has been set in motion, the centrifugal force of weights 115 overpowers spring 112 moving the plunger 111 to open position. Drive shaft 117 is driven by worm gear 118 meshing with a worm 119 on the propeller shaft 11. A suitable casing and frame 117' is provided in which the shaft 117, weights 115 and plunger 111 are mounted and lubricated.

In the operation of the described embodiment, the selector valve is in neutral position when the vehicle is at rest. As the operator depresses the clutch pedal to clutch disengaging position, the selector valve is moved to first speed position by spring 75 when freed by movement of the clutch pedal controlled plunger 97, and by engaging the clutch while opening the throttle, the vehicle is set in motion. Preferably the clutch is fully engaged prior to the time that the end of plunger 97 engages the ledge 99 and while valve 65 is closed just prior to the complete engagement of the clutch.

As soon as the vehicle is set in motion, the valve plunger 111 is moved to the right by inertia, elements 115 opening valve 114 to apply vacuum to the end of piston 70 and move the valve body 43 to second speed position where it is held by latch 82. When the clutch is next disengaged, vacuum is applied through valve 65 to the selector valve and the gears are shifted to second speed position. This shifting retracts latch 82 and then upon engagement of the clutch, latch 81 is retracted allowing the selector valve 43 to be moved by vacuum to third speed position. When the clutch is next disengaged, the vacuum will be applied to piston 26 to move the gears to third speed position, regardless of vehicle speed (unless the vehicle speed has fallen below the predetermined minimum necessary to open valve 114).

When the operator wishes to mesh the gears in second speed, as in shifting from third to second speed for compression in descending a grade, the clutch pedal 15 is depressed to its extreme position, moving the valve 43 to second speed position (Figure 7) against the force of the servomotor 70 and at the same time opening valve 65 to apply vacuum to the selector valve and through it to the forward end of piston 26.

As the vehicle is brought to rest, the thrust on plunger 111 is relieved, permitting the valve plunger 111 to move to the left, venting the cylinder 71 and returning the valve to neutral position by the force of spring 75, and as the clutch is disengaged vacuum is applied through the selector valve to move the pistons 25 and 26 to neutral position.

The operation of the selector valve may be described in greater detail, as follows:

With the selector valve in its extreme left position as shown in Figure 10, suction is applied to the main port 200, through passageway 201 to the hollow interior 202 of valve 43, from which it is applied through port 203 to the port 204 forming the end of port 50. Simultaneously, air is admitted through ports 208' and 206 to port 207 forming the end of the reverse duct 208, and the difference in pressure thus established between the two faces of piston 25 causes the piston to move to its first speed position.

The selector valve, upon release of the latch 81 by clutch engagement, before latch 82 has been released by the shifting of the gears into second speed, is next moved by piston 70 to the position where its left hand end 90 is opposite the numeral "2" in Figure 10, and at this time suction is applied to ports 210 and 211, which are then in register, and is thus applied to duct 57 serving to return the piston 25 to neutral position and thereafter move the piston 26 to second speed position. During this movement air is admitted to the first speed end of the cylinder 27 and the third speed end of cylinder 28, through port 204 and venting port 212, this air being first admitted to the cylinder 27 through duct 50 and groove 51, and thereafter to the cylinder 28 as soon as the piston 27 has been moved from neutral position.

When the operator next depresses the clutch pedal, retracting latch 81, the piston 70 and valve 43 are moved to third speed position, with the valve end 90 opposite the figure "3" in Figure 10. In this position, suction is applied directly from the right-hand end of passageway 201 to port 220 which is the end of duct 60, and the suction is thereby applied to the third speed end of cylinder 28. As the piston 26 moves, air is admitted to the other end of cylinder 28 through duct 57, groove 58, port 211 and port 222 and venting port 57'.

For shifting the gears to neutral position from first or reverse, the valve 43 is positioned in neutral with its end 90 opposite the letter "N" in Figure 10 by movement of the push pull wire 105, which is accomplished by movement of the clutch pedal 15 to a position short of its optional second speed position. In this position, ports 230 and 231 are in register and suction is applied through port 230 to port 231 and thence to duct 55 which communicates with the central portion of both cylinders 27 and 28. During this movement air is admitted to the first speed end of the cylinder 27 through port 233 which is then in register with port 204 of duct 50, or if the reversing valve 62 is in reverse position, the reverse end of cylinder 27 is vented through venting ducts 50 and 63 and bridging groove 240 in the reversing valve slide 62. Vent 203' and duct 63 provide for venting the reverse end of the cylinder 27 with the selector valve in neutral position.

When it is desired to shift to reverse, the vehicle is brought to a stop, the reverse valve 62 is moved forwardly and vacuum is applied through the first speed-line to the reverse side of piston 25 through ports 63, 240 and 50 (ports 63 and 208 being normally connected in the forward position by a bridging port 208').

The invention in its broader aspects is not limited to the specific mechanisms shown and described but departures may be made therefrom within the scope of the accompanying claims without departing from the principles of the invention and without sacrificing its chief advantages.

What we claim is:

1. In an automotive vehicle including the combination of a clutch, operating means therefor, a selective gear transmission, power operated means for selectively shifting the transmission gears, a selector controlling the application of power to said means, a fluid pressure actuated servomotor for moving said selector, means controlled by the clutch operating means for controlling the application of power to the power operated means through said selector, and means responsive to movement of the vehicle for controlling the application of power to the servomotor.

2. In an automotive vehicle including the combination of a selective gear transmission, a clutch through which power is applied to the transmission, means for moving the clutch to engaged and disengaged position, power operated means for selectively shifting the transmission gears, a selector controlling the application of power to said means, means controlled by the clutch moving means for controlling the application of power to the shifting means, a servomotor for moving said selector and means responsive to movement of the vehicle for controlling the application of power to the servomotor.

3. In an automotive vehicle including the combination of a selective gear transmission, means for establishing a difference in fluid pressure, fluid pressure operated means for selectively shifting the transmission gears, a selector valve controlling the application of fluid pressure to said fluid pressure operated means, a servomotor for moving said valve, means for limiting movement of the selector valve, means for releasing said limiting means, and means responsive to movement of the vehicle for controlling the application of power to the servomotor.

4. In an automotive vehicle including the combination of a selective gear transmission, a clutch through which power is applied to the transmission, means for moving the clutch to engaged or disengaged position, means for establishing a difference in fluid pressure, fluid pressure operated means for selectively shifting the transmission gears, a selector valve controlling the application of fluid pressure to said fluid pressure operated means, means controlled by the clutch moving means for controlling the application of fluid pressure to the shifting means, a servomotor for moving said valve, means operated by the clutch moving means for moving the valve from one position to another and means responsive to movement of the vehicle for controlling the application of power to the servomotor.

5. In an automotive vehicle including the combination of a selective gear transmission, a clutch through which power is applied to the transmission, means for moving the clutch to engaged or disengaged position, means for establishing a difference in fluid pressure, fluid pressure operated means for selectively shifting the transmission gears, a selector valve controlling the application of fluid pressure to said fluid pressure operated means, a servomotor for moving said valve, means controlled by the clutch moving means for moving the valve from a neutral to a low speed position and means responsive to movement of the vehicle for controlling the application of power to the servomotor.

6. In an automotive vehicle including the combination of a selective gear transmission, a clutch through which power is applied to the transmission, means for moving the clutch to engaged or disengaged position, means for establishing a difference in fluid pressure, fluid pressure operated means for selectively shifting the transmission gears, a selector valve controlling the application of fluid pressure to said fluid pressure operated means, a servomotor for moving said valve, means operated concomitantly with the clutch moving means for moving the valve to an intermediate speed position and means responsive to movement of the vehicle for controlling the application of power to the servomotor.

7. In an automotive vehicle including the combination of a selective gear transmission, a clutch through which power is applied to the transmission, means for moving the clutch to engaged and disengaged position, means for establishing a difference in fluid pressure, fluid pressure operated means for selectively shifting the transmission gears, a selector valve controlling the application of fluid pressure to said fluid pressure operated means, a valve controlled by the clutch moving means controlling application of fluid pressure to the shifting means, a fluid pressure operated servomotor for moving said selector valve and means responsive to movement of the vehicle for controlling the application of power to the servomotor.

8. In an automotive vehicle including the combination of a selective gear transmission, a clutch through which power is applied to the transmission, means for moving the clutch to engaged and disengaged position, means for establishing a difference in fluid pressure, fluid pressure operated means for selectively shifting the transmission gears, a selector valve controlling the application of fluid pressure to said fluid pressure operated means, means operated by the clutch moving means for moving the valve from one position to another, means operated concomitantly with the clutch moving means for moving the valve to an intermediate speed position and means responsive to movement of the vehicle for controlling the application of power to the servomotor.

9. In an automotive vehicle including the combination of a selective gear transmission, a clutch through which power is applied to the transmission, means for moving the clutch to engaged and disengaged position, means for establishing a difference in fluid pressure, fluid pressure operated means for selectively shifting the transmission gears, a selector valve controlling the application of fluid pressure to said fluid pressure operated means, means controlled by the clutch moving means for controlling the application of fluid pressure to the shifting means, a servomotor for moving said valve, means for limiting movement of the selector valve, means for releasing said limiting means, means controlled by the clutch moving means for moving the valve from a neutral to a low speed position, means operated concomitantly with the clutch moving means for moving the valve to an intermediate speed position and means responsive to movement of the vehicle for controlling the application of power to the servomotor.

10. In an automotive vehicle including the combination of a selective gear transmission, a clutch through which power is applied to the transmission, means for moving the clutch to engaged and disengaged position, means for establishing a difference in fluid pressure, fluid pressure operated means for selectively shifting the transmission gears, a selector valve controlling the application of fluid pressure to said fluid pressure operated means, means controlled by the clutch moving means for controlling the application of fluid pressure to the shifting means, a fluid pressure operated servomotor for moving said valve, means for limiting movement of the selector valve, means for releasing said limiting means, means controlled by the clutch moving means for moving the valve from a neutral to a low speed position, means operated concomitantly with the clutch moving means for moving the valve to an intermediate speed position, and means responsive to movement of the vehicle for controlling the application of power to the servomotor.

11. In an automotive vehicle including the combination of a selective gear transmission, a clutch through which power is applied to the transmission, means for moving the clutch to engaged and disengaged position, a source of vacuum, vacuum operated means for selectively shifting the transmission gears, a selector valve controlling the application of vacuum to said means, means controlled by the clutch engaging and disengaging means for controlling the application of vacuum to the shifting means, a servomotor for moving said valve and means responsive to movement of the vehicle for controlling the application of power to the servomotor.

12. In an automotive vehicle including the combination of a selective gear transmission, a source of vacuum, vacuum operated means for selectively shifting the transmission gears, a selector valve controlling the application of vacuum to said means, a servomotor for moving said valve, means for limiting movement of the selector valve, means for releasing said limiting means and means responsive to movement of the vehicle for controlling the application of power to the servomotor.

13. In an automotive vehicle including the combination of a selective gear transmission, a clutch through which power is applied to the transmission, means for moving the clutch to engaged and disengaged position, a source of vacuum, vacuum operated means for selectively shifting the transmission gears, a selector valve controlling the application of vacuum to said means, means controlled by the clutch engaging and disengaging means for controlling the application of vacuum to the shifting means, a servomotor for moving said valve, means controlled by the clutch engaging and disengaging means for moving the valve from a neutral to a low speed position and means responsive to movement of the vehicle for controlling the application of power to the servomotor.

14. In an automotive vehicle including the combination of a selective gear transmission, a clutch through which power is applied to the transmission, means for moving the clutch to engaged and disengaged position, a source of vacuum, vacuum operated means for selectively shifting the transmission gears, a selector valve controlling the application of vacuum to said means, means controlled by the clutch engaging and disengaging means for controlling the application of vacuum to the shifting means, a servomotor for moving said valve, means operated concomitantly with the clutch engaging and disengaging means for moving the valve to an intermediate speed position and means responsive to movement of the vehicle for controlling the application of power to the servomotor.

15. In an automotive vehicle including the combination of a selective gear transmission, a clutch through which power is applied to the transmission, means for moving the clutch to engaged and disengaged position, a source of vacuum, vacuum operated means for selectively shifting the transmission gears, a selector valve controlling the application of vacuum to said means, means controlled by the clutch engaging and disengaging means for controlling the application of vacuum to the shifting means, a servomotor for moving said valve, means for limiting movement of the selector valve, means for releasing said limiting means, means controlled by the clutch engaging and disengaging means for moving the valve from a neutral to a low speed position, means operated concomitantly with the clutch engaging and disengaging means for moving the valve to an intermediate speed position and means responsive to movement of the vehicle for controlling the application of power to the servomotor.

16. In an automotive vehicle the combination of a selective gear transmission, a clutch, an engine driving the vehicle through the transmission and clutch, power means for shifting the transmission gears from one speed position to another, a selector means controlling the application of power to the power means, fluid pressure actuated power means for moving the selector means when the vehicle is in motion, and means controlled by the operation of the clutch engaging and disengaging means for controlling movement of the selector means under influence of the second power moving means.

17. In an automotive vehicle including the combination of a selective gear transmission, a source of vacuum, vacuum operated means for selectively shifting the transmission gears, a selector controlling the application of vacuum to said means, servomotor means for alternatively moving the selector towards a high or a low speed position and means responsive to movement of the vehicle for controlling the application of power to the servomotor.

18. In an automotive vehicle including the combination of a selective gear transmission, a source of vacuum, vacuum operated means for selectively shifting the transmission gears, a selector controlling the application of vacuum to said means, a control device having only two effective positions and controlling the direction of movement of the selector, and releasable means for limiting movement of the selector to an intermediate position.

19. In an automotive vehicle including the combination of a selective gear transmission, a source of vacuum, vacuum operated means for selectively shifting the transmission gears, a selector controlling the application of vacuum to said means, a control device controlling the direction of movement of the selector and having fewer effective positions than the selector, and releasable means for limiting movement of the selector to an intermediate position.

PHILIP M. CARTER.
LOUIS A. LARSEN.